Dec. 3, 1935.  H. R. PALMER  2,023,029
LAWN MOWER
Filed Feb. 2, 1933  3 Sheets-Sheet 1
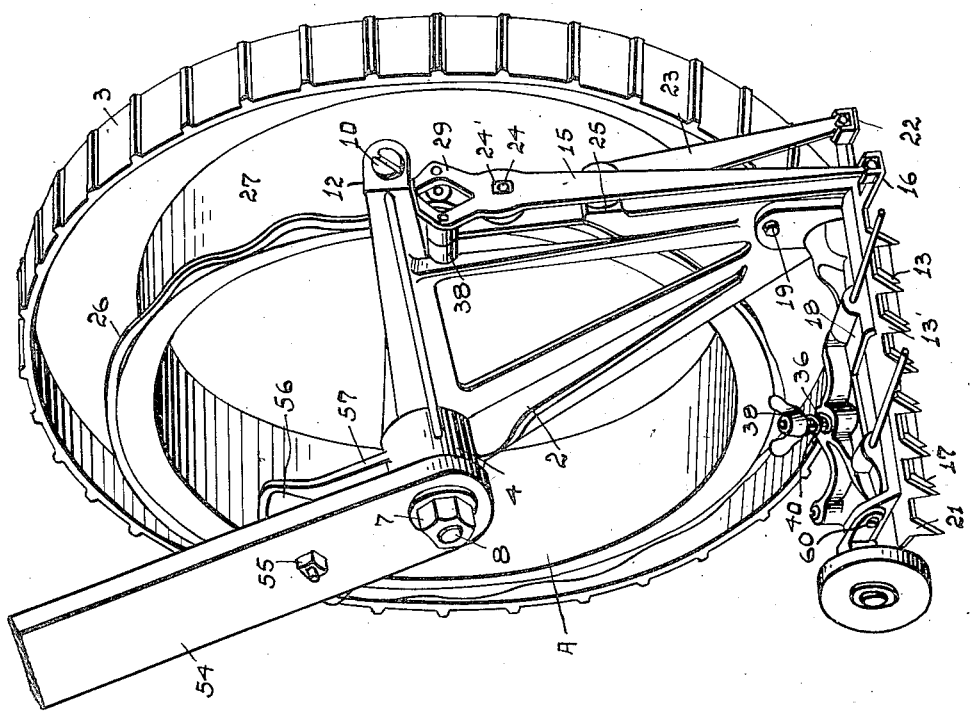
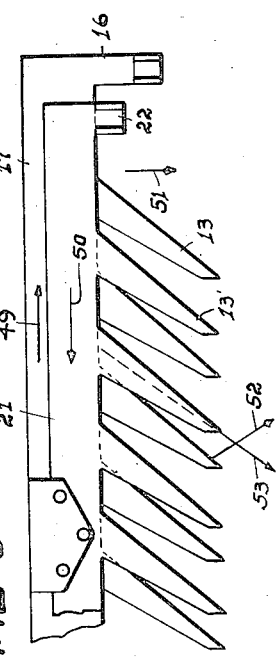
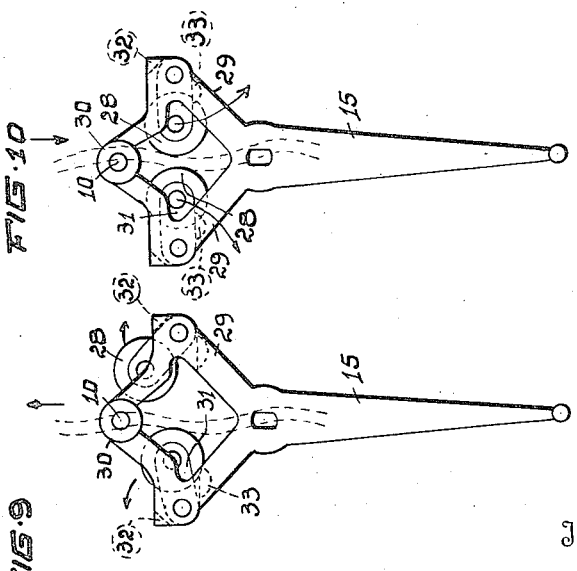
Inventor
HERBERT R. PALMER
By Fisher, Moser and Moore
Attorneys

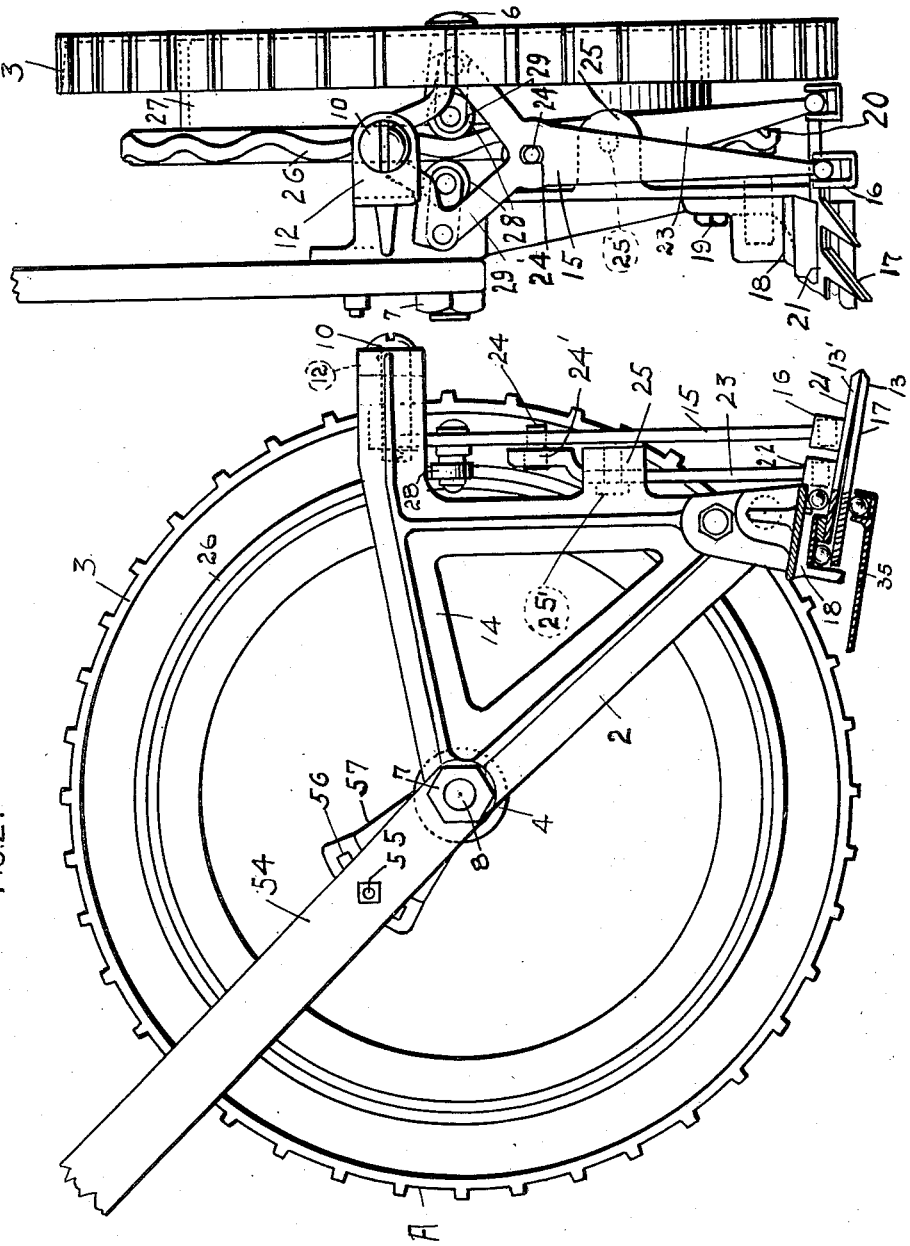

Dec. 3, 1935.  H. R. PALMER  2,023,029
LAWN MOWER
Filed Feb. 2, 1933   3 Sheets-Sheet 3
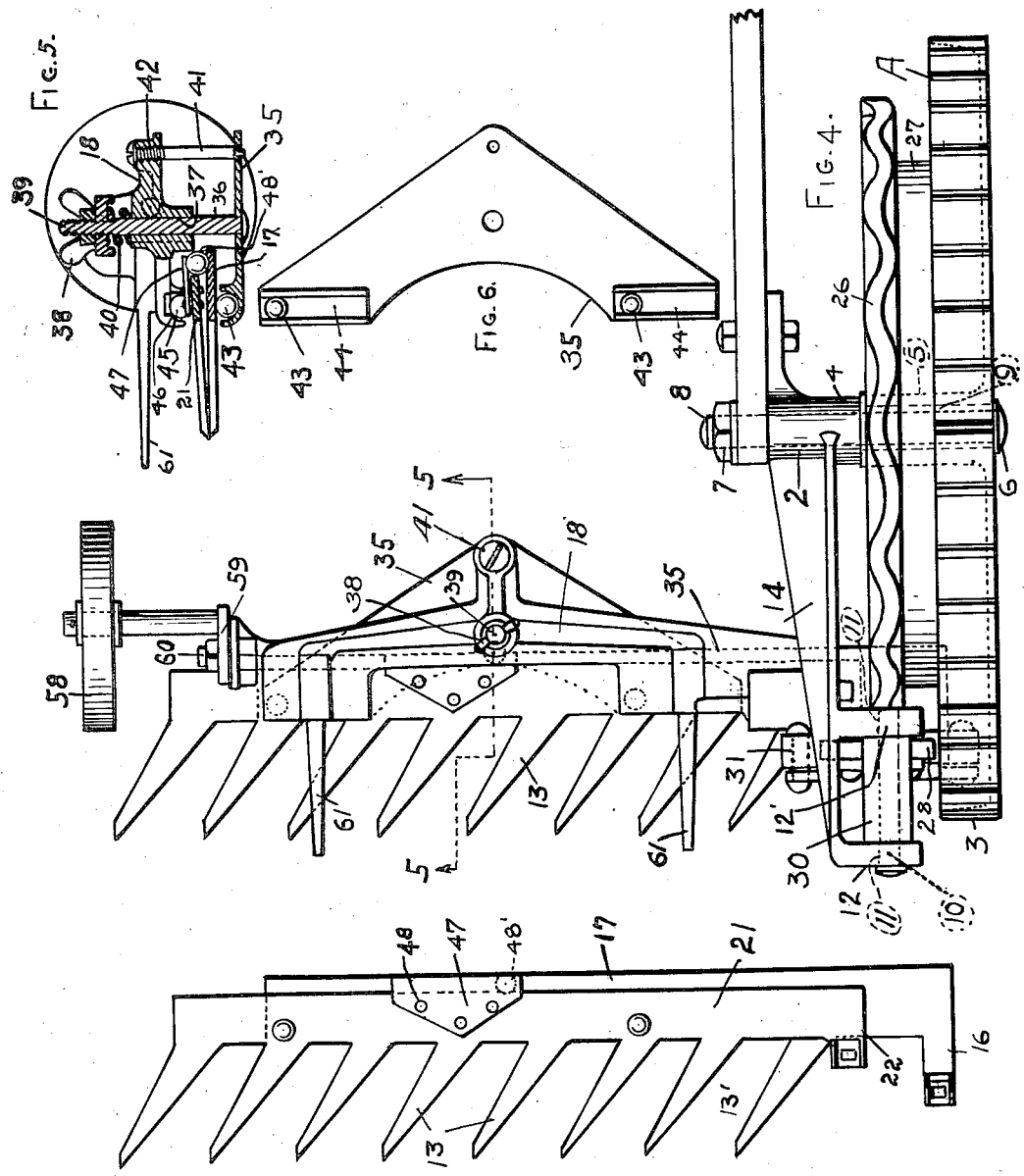
INVENTOR.
HERBERT R. PALMER
BY
ATTORNEY.

Patented Dec. 3, 1935

2,023,029

UNITED STATES PATENT OFFICE 2,023,029

LAWN MOWER

Herbert R. Palmer, Shaker Village, Ohio, assignor of one-half to Thomas H. Tubman, Akron, Ohio Application February 2, 1933, Serial No. 654,931

2 Claims. (Cl. 56—264)

This invention relates to lawn mowers, and more particularly to that type of mower employing a reciprocating cutting mechanism, and while specifically adapted for trimming grass adjacent the marginal edges of lawns, trees, near walks and other inaccessible places, may with slight changes be embodied in a conventional lawn mower.

The principal object of the present invention is to provide a lawn mower of this type which shall be of simple construction, durable in use, comparatively inexpensive of production, easily operated, and efficient in action.

Another object of the invention is the elimination of gears and other complicated mechanism heretofore forming part of such devices.

A further object of the invention is the provision of efficient means for positively reciprocating a plurality of cooperating cutting knives in opposite directions with a double shearing action or effect on the grass being cut.

Still another object of the invention is the provision of cutting knives reciprocated in opposite directions with respect to each other and formed with cutting teeth angularly related with respect to the direction of the reciprocatory movement, to effect combing of the grass without bending same prior to its cutting.

A still further object of the invention is the provision of three supports for the cutting knives to insure proper alignment of the knives with respect to each other during combing and trimming operations.

Other and further objects and advantages will be apparent as the specification is considered in connection with the accompanying drawings, in which:

Figure 1 is a perspective view of a grass trimmer according to the invention;

Figure 2 is a cross sectional view through the cutting knives of the grass trimmer showing the operating mechanism in elevation;

Figure 3 is a side view of the trimmer with the cutting blades partly broken away;

Figure 4 is a plan view of the grass trimmer according to the invention;

Figure 5 is a sectional view on line 5—5 of Figure 4;

Figure 6 is a plan view of the plate which secures the lower cutter blade in working position;

Figure 7 is a plan view of the blades at the end of their reciprocatory movement in one direction;

Figure 8 is a plan view of the blades while reciprocating;

Figures 9 and 10 are diagrammatic views of the operating lever arrangement during forward and backward travel of the grass cutter.

Referring more particularly to the drawings A denotes a preferred form of grass trimmer constructed in accordance with my invention and comprising a substantially triangular frame 2, to which the traction wheel 3 is rotatably connected by means of a headed axle bolt 6. The frame 2 is formed with an enlarged bearing portion 4 and the wheel 3 is provided with a hub 5 aligned with and opposed to bearing 4. The bolt 6 passes through the hub and bearing portion and secures the wheel and frame of the trimmer together when nut 7 is screwed home on the projecting threaded end 8 of the bolt. A metal sleeve or bushing member 9, mounted in the hub 5 of wheel 3 takes the thrust of body portion 4, thus permitting free rotary movement of the wheel with respect to frame 2.

An operating lever 15 pivotally supported at its upper end on a pin 10 extending through aligned openings 11 in parallel lateral flanges 12, 12' on the leg 14 of triangular frame 2, is coupled at its lower end with the lateral extension 16 of a lower reciprocable cutter blade 17. This blade is slidably mounted in a bracket member 18, arranged rectangularly to frame 2 and secured to the latter by means of screw bolts 19, 20. A second and upper reciprocable cutter blade 21 superposed upon blade 17, and provided with a lateral extension 22 for connection with a second operating lever 23 cooperates with said first blade when the machine is being propelled. Lever 23 is pivotally connected at its upper end to operating lever 15 by means of a pivot pin 24 fixed to the latter and extending through the lever 15 and into a slot 24' in lever 23. Lever 23 is also pivotally connected intermediate its length to a rectangular extension 25 on frame 2, by means of a pivot bolt 25', so that working movements of lever 15 in one direction cause lever 23 to rock in the opposite direction. Such movement of lever 15 is effected by means of a sinuous cam 26 fixed to an annular flange 27 on wheel 3, which cam is engaged at opposite sides thereof by a pair of horizontally spaced rollers 28, hingedly secured to lever 15. The upper end of lever 15 is preferably formed with angularly bent arms 29 connected at their upper extremities to a sleeve 30 through which pin 10 extends. The arms 29 pivotally support links 31, the free ends of which carry the rollers 28. Stop shoulders 32, 33 respectively limit the movement of links 31 and therewith the movement of rollers 28 during forward and backward movement of the grass trimmer, see Figures 9 and 10. When traction wheel 3 is rotated and its cam 26 is rotated in a forward direction the levers 31 are frictionally shifted into axial alignment with respect to each other, see Fig. 10, so that the rollers 28 oppose each other and snugly engage opposite sides of cam 26. This position of the rollers causes lever 15 to rock about the pin 10 as on an axis. This movement causes the lower cutter blade 17 to reciprocate in one direction and the upper cutter blade 21 to reciprocate in the opposite direction as will be readily understood from an inspection of Figures 1 and 3.

When traction wheel 3 and its cam 26 travels in backward direction, then the levers 31 are frictionally shifted out of alignment with each other, see Fig. 9, in which position the levers 31 can oscillate around their pivots without imparting reciprocatory movement to cutter blades 17 and 21.

The free ends of the cutter blades are yieldingly pressed together and anti-frictionally supported for reciprocal movement with respect to each other in the following manner. A plate 35 is adjustably and yieldingly held in engagement with the under face of lower cutter blade 17 by means of a headed bolt 36, which extends slidably through an opening 37 in bracket 18. A bolt 41, extending through a threaded opening 42 in bracket 18, loosely engages the rear edges of bottom plate 35 and acts as fulcrum and while holding the plate in spaced relation with respect to the bracket 18, it permits of a slight rocking movement of plate 35 about bolt 41 as a fulcrum. Consequently when thumb nut 38 is screwed home on the threaded upper end of bolt 36, against the tension of coiled spring 40, the front edges of plate 35 will be tilted upwardly thus forcing lower cutter blade 17 into resilient engagement with upper blade 21. In order to reduce friction to a minimum, ball bearings 43 are mounted in channels 44 formed in the top of plate 35 at opposite ends thereof, one ball for each channel and similar ball bearings 45 are arranged in channels 46 at the opposite ends of the bottom face of bracket 18. To insure efficient shearing or cutting action, the blades are tilted slightly in a forwardly direction toward each other by means of a ball bearing 48' arranged approximately midway the length of and between the bottom cutter blade 17 and a plate 47 carried by the upper cutter blade 21 and secured thereto by rivets 48. This mounting of each blade on 3 steel balls insures perfect alignment of the blades during their reciprocatory movements.

Each cutter blade 17 and 21 is provided with a plurality of spaced pointed cutting teeth 13 and 13' respectively axially inclined with respect to the longitudinal axis of the blade. The cutting teeth thus engage the blades of grass with a straight combing action when shifted in one direction during forward movement of the grass trimmer, and with a scissors like cutting action when shifted in the opposite direction. The action of the cutter blades is illustrated in Figure 8 in which the lower blade 17 is shown as being moved inwardly and the upper blade outwardly, as indicated by arrows 49 and 50. When the grass trimmer is being propelled forwardly in the direction indicated by arrow 51, the cutters 17 and 21 will move relatively to the ground in the paths indicated by arrows 52 and 53 respectively. The teeth 13' of cutter 21 therefore comb almost straight through the grass with little bending of individual blades, and the cutting teeth 13 of cutter 17, which move at an acute angle to the grass, bend the same toward the cutting edges of the teeth 13'. Consequently the cutter blades 21 hold the grass while the blades 17 cut the same. When the movement of blades 17 and 21 is reversed the action of the blades is also reversed, so that the blade 17 holds the grass while blade 21 does the cutting.

The device is manually propelled by means of a handle 54 mounted on the extended threaded end of headed axle bolt 6, and adjustment of the handle can be effected by means of a headed clamping screw 55 which passes through the handle and through a curved slot 56 in lug 57 on frame 2. A supporting roller 58 is adjustably secured to the free end of bracket member 18 by means of an angle and bracket 59, in turn pivotally secured to said member 18 by a headed bolt 60, thus permitting any desired elevation of the cutters with respect to the ground. A pair of bumpers 61 secured to member 18 prevents injury to the cutting knives when the grass trimmer is in use.

Having thus described my invention, what I claim is:

1. In a grass trimmer embodying cam means for reciprocatory rocking movement of two levers in opposite directions, two cutting blades slidably mounted for reciprocatory movements in opposite directions with respect to each other, two symmetrically arranged bearing balls for each of said cutting blades, said balls bearing upon the outside of said blades for forcing said blades toward each other and a spacing ball arranged between the bottom blade and an extended portion of the upper blade near the rear edges thereof for tilting said blades with respect to each other.

2. In a grass trimmer embodying a traction wheel for propelling said trimmer, two cutting blades mounted for reciprocatory movement in opposite directions with respect to each other, means to reciprocate said cutting blades in opposite directions when said trimmer is propelled, and integral cutting teeth on and projecting laterally from said blades, said cutting teeth being arranged within the plane of their respective cutting blades and having their longitudinal axes and their cutting edges inclined with respect to the longitudinal axes of said cutting blades to effect cutting with one of said blades while combing the grass to be cut with the other of said blades in the direction of the movement of the propelled trimmer.

HERBERT R. PALMER.